United States Patent [19]
Martinez, Sr.

[11] Patent Number: 5,841,595
[45] Date of Patent: Nov. 24, 1998

[54] THIN FILM MIRROR FRAME

[76] Inventor: Eugene Eustaquio Martinez, Sr., 3 Woodbine Rd., Irvington, N.Y. 10533

[21] Appl. No.: 606,367

[22] Filed: Feb. 23, 1996

[51] Int. Cl.⁶ .............................. G02B 5/08; G02B 7/182
[52] U.S. Cl. ............................................ 359/847; 359/883
[58] Field of Search ..................... 359/847, 848, 359/883, 884, 846

[56] References Cited

U.S. PATENT DOCUMENTS

| | | | |
|---|---|---|---|
| 3,552,835 | 1/1971 | Benzies .................................... | 359/847 |
| 3,687,524 | 8/1972 | Martinez .................................. | 359/847 |
| 3,733,116 | 5/1973 | Hutchinson ............................. | 359/847 |
| 3,880,500 | 4/1975 | Kojabashian ........................... | 359/847 |
| 4,422,723 | 12/1983 | Williams, Jr. et al. ................. | 359/847 |
| 4,902,085 | 2/1990 | Murakoshi et al. .................... | 359/216 |
| 5,247,395 | 9/1993 | Martinez ................................. | 359/883 |

*Primary Examiner*—Paul M. Dzerzynski
*Assistant Examiner*—Mark A. Robinson
*Attorney, Agent, or Firm*—Darby & Darby

[57] ABSTRACT

A frame defining a central region for supporting a thin mirror film across the central region within a film plane. The frame includes four supporting members each joined together and having a longitudinal axis, an adhering surface and a forward surface. A supporting ridge is provided on the forward surface of each frame member being generally parallel to the longitudinal axis thereof. The supporting ridge is positioned intermediate the adhering surface and the central region. The supporting surface protrudes from the forward surface by a predetermined distance and is adapted to support a thin mirror film tautly across the central region within the film plane.

25 Claims, 1 Drawing Sheet

THIN FILM MIRROR FRAME

FIELD OF THE INVENTION

This invention relates generally to structures for reflecting images. More specifically, this invention relates to frame arrangements for supporting mirror structures created with thin film material.

BACKGROUND OF THE INVENTION

While glass mirrors have been common for centuries, they are not always appropriate for certain locations or situations, such as in public washrooms, gyms, locker rooms, etc., where the opportunity for vandalism and acts or the possibility of liability from injury due to broken glass is increased. In these locations, buildings have searched for other materials to be able to provide the washroom patrons with the amenities of a mirror, without the accompanying risk.

Additionally, such mirrors have found usage in optical systems such as large television sets, but they suffer from the same problems (i.e., breakage during shipment, handling or even manufacture).

From many years, polished metal plates have been used in this situation but with only partial success. While the plates are much sturdier and less likely to cause injury, the quality of the mirror is significantly decreased. The plates can become warped or dented, distorting the image. They also tend to have poor or effective characteristics thereby making the mirror darker and harder to see. Mounting and/or replacing the plates can also become time-consuming and costly, since the plates are evenly mounted to a wall by semi-permanent fasteners.

In any of these situations, glass mirrors can also have their own drawbacks. First, they are generally quite heavy and break easily. Because the glass mirror must be relatively thick to avoid being easily broken, the mirror image can be degraded, as the thick glass absorbs or defuses some of the light passing through. Additionally, with the reflective material at the back of the glass for protection purposes, a dual image can occur from a slight reflection off the front surface of the glass, which then becomes a second reflective surface.

Glass is often molded and is therefore easily susceptible to imperfections in its thickness and planar surfaces. This results in warped and distorted images, such as those in carnival mirrors, although to a lesser extent.

U.S. Pat. No. 5,247,395 (whose contents are incorporated herein by reference) provides a mirror frame arrangement having a thin film mirror. It was found that the frame of the '395 patent suffered from the drawback in that the mirror film tended to flex toward the foam backing after a period of time, which of course created distortion in the reflective properties of the mirror. It is an object of this invention to provide a thin film mirror as disclosed in U.S. Pat. No. 5,247,395 having an improved frame arrangement which more securely supports the thin film mirror against the mirror frame.

SUMMARY OF THE INVENTION

The present invention relates to a thin film mirror including a frame arrangement having a reflective thin film supported across a central region. The frame arrangement includes at least one supporting member having an adhering surface, a forward surface and a rearward surface.

The forward surface of the supporting member includes a supporting ridge extending along the periphery thereof and positioned intermediate the adhering surface and the central region. The supporting ridge protrudes from the forward surface by a predetermined distance. The supporting ridge is configured to support a thin film mirror above a foam backing such that the mirror retains its reflective properties over a period of time. It is noted that the supporting ridge will also support a thin mirror film above an open panel (i.e. a frame arrangement that does not include a foam backing).

The rearward surface of the supporting member includes a stacking ridge extending along the periphery thereof and protruding from the rearward surface by a predetermined distance. The stacking ridge is positioned outwardly from the supporting ridge relative to the central region such that the frame may be stacked atop the forward surface of another frame without contacting the tautly supported mirror film associated with the other frame.

BRIEF DESCRIPTION OF THE DRAWINGS

Further features of the present invention will become readily apparent from the following detailed description of the invention taken in conjunction with the accompanying drawings, in which.

DETAILED DESCRIPTION OF THE PREFERRED EMBODIMENTS

Figure 1:
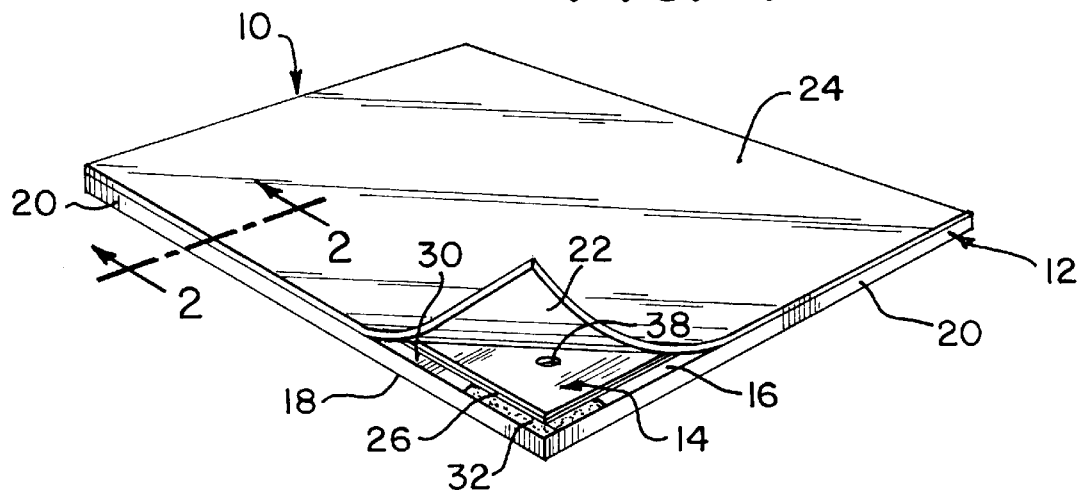
FIG. 1 is a perspective view of a mirror constructed according to the present invention.

Referring to the drawings, in which like reference numerals identify similar or identical elements, FIG. 1 illustrates a lightweight thin film mirror 10 constructed according to the present invention. A frame 12 is provided and is preferably polygonal having any number of sides. For example, the mirror 10 may have a rectangular configuration as shown. Alternatively, it may be triangular, octagonal, circular, or any other geometric shape which defines a central region 14. Frame 12 is provided with a forward surface 16 and an opposing rearward surface 18. The frame 12 can be formed as a one-piece item, or formed from several pieces. The frame 12 is preferably formed from aluminum or other metal or plastic members 20 along the periphery.

Although the present invention frame 12 is taught in conjunction with a thin film mirrored panel, it is to be understood that the use of the frame is not only for use with thin film mirror panels as it may be used with decorative films. More particularly, frame 12 may be used in conjunction with any decorative panel (e.g. poster, picture, map, sign or the like). However, for ease of illustration only, the preferred embodiment of the present invention is described hereinbelow with reference to a thin film mirrored panel.

Figure 2:
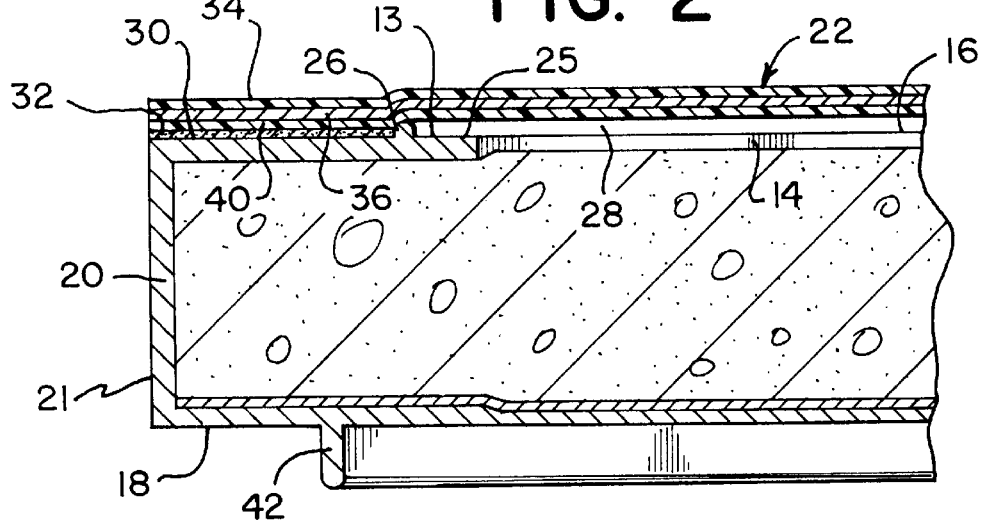
FIG. 2 is a cross-sectional view thereof taken along line 2—2 of FIG. 1 and looking in the direction of the arrows.

With reference to FIGS. 1 and 2, and as will be further described below, a thin metalized mirror film 22 is preferably tautly supported across the central region 14 providing a mirrored outer surface 24 on the forward surface 16 of the frame 12. Frame 12 comprises of molded, stamped or preformed members 20 having a supporting ridge 26 preferably extending along its entire periphery and protruding above the forward surface 16 by a predetermined distance. Supporting ridge 26 is configured to tautly support the thin metalized mirror film 22 such that there is an air gap 28 disposed between the central region 14 and film 22. Ridge 26 lifts film 22 over central region 14 so that it does not contact an inner peripheral edge 25 of the forward surface 16 of frame 12, thereby ensuring that film 22 will be free of wrinkles or other imperfections. For example, if the film 22 were to contact the forward surface 16 inwardly from ridge 26, the film 22 may become contaminated, thus detracting from the reflective properties of the film. It is noted that the portion 13 of frame 12 which extends inwardly from ridge 26 on forward surface 16, is not under a necessary element of frame 12 as it is only illustrated in the preferred embodiment of FIG. 1. Portion 13 is preferred because it permits the frame to be built in a balanced extrusion process. Also, longer legs permit the frame to be stronger. Thus, it is to be appreciated that frame 12 in accordance with the present invention may be manufactured with no structure extending inwardly from supporting ridge 26.

The outer area 30 surrounds the securing ridge 26, relative to the central region 14, and is preferably provided with an adhesive to fixedly connect the thin metalized mirror film 22 to the frame 12. The adhering surface 30 is preferably provided with double-sided pressure-sensitive tape 32 extending along the periphery of the frame 12. It is to be appreciated that other forms of adhesive, such as transfer tape or a liquid adhesive may also be used. It is also to be understood that the outer facing side walls 21 of the frame 12 may also comprise the adhering surface.

Figure 4:
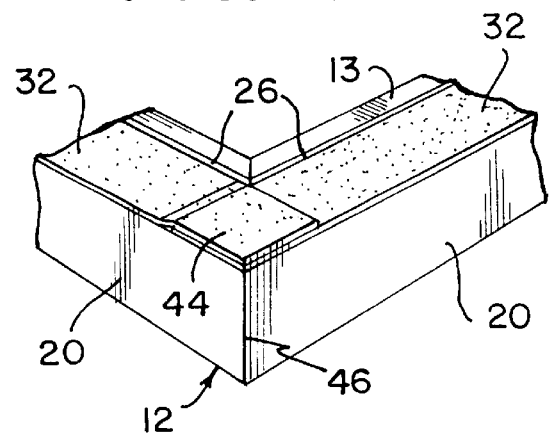
FIG. 4 is a perspective corner view of the frame arrangement of FIG. 1 having the mirrored film removed therefrom.

As shown in FIG. 4, the end portions 44 of pressure-sensitive tape 32 overlap one another at the corner portions 46 of the frame 12. Preferably, the defined height of the overlapped portions of tape 32 at the corner portions 46 is approximately equal to predetermined protruding distance of the supporting ridge 26.

The overlapping of the pressure-sensitive tape 32, avoids or minimizes the forming of a compound curve of film 22 at the corner portions 46 of the frame 12. In other words, the overlapping of the tape 32 in the corners of the frame further lifts film 22 over ridge 26 to ensure that the film 22 is free of wrinkles in the corner area. This is especially important in the corners of the frame because the film is not as flexible in the corners. It is also important to maintain tight tolerance with respect to the co-planar nature of the entire supporting ridge 26 such that the mirror film 22 will be planar when adhered to the double-sided tape 32 surrounding the elongated securing ridge 26. It is preferred to first stretch the thin mirror film 22 and then to apply it to the double-sided pressure-sensitive tape 32. Thus, it is preferable to adhere the mirror film 22 to the frame 1 2 in a taut or stretched condition. The stretched film 22 provides highly reflective mirror surface qualities.

With continued reference to FIG. 2, there is shown a cross-sectional view taken along lines 2—2 of FIG. 1. The base of the thin mirror film 22 is preferably a plastic sheet 34, such as a polyamide or polyester, (e.g. polyethylene terephthalate). Of course, other types of plastic films may be used. To give the film 22 reflective characteristics, the plastic sheet 34 may have a protective layer 36 of aluminum, silver, chromium and the like deposited on one reflective surface.

In the preferred embodiment, this reflective layer 36 is oriented toward the central region 14 of the frame 12, with the air gap 28 between the frame 12 and film 22. This pocket of air 28 is preferably vented to the surrounding atmosphere through vent holes 38. This ventilation is necessary to compensate for surrounding air pressure changes, which would distort the stretched thin mirror film 22 if the enclosed inner area 28 was sealed. A byproduct of this venting is the contact between the ambient air and its constituents with the mirror film 22, thereby inviting corrosion of the metal reflective surface.

To prevent any environmental damage (from elements such as salt, fog and humidity) to the reflective layer 36, the surface of the reflective layer 36 opposite to the thin plastic sheet 34 is provided a protective layer 40, preferably a coating of plastic resin. The protective layer may also be aluminum. However, the resin coating 40 is preferably acrylic or vinyl and can be applied in one or several coats to achieve complete coverage of the metal reflective layer 36.

In the preferred embodiments, the thin plastic sheet 34 has a thickness in the range of 0.0005–0.01 inches and preferably from 0.001 to 0.005 inches, although other thicknesses are possible. Thus, the mirror film 22 of the present invention protects the reflective metal layer 26 from salt, fog and humidity, regardless of whether the metal layer faces inward or outward of the frame 12. Additionally, with the protective coating 40 against the frame 12, it can be used for adhering a mirror film 22 to the frame 12, without the need for extra adhesives or processing steps. In other embodiments the film 22 may be for decorative purposes and may simply constitute a color film, which has minimal reflective properties.

Figure 3:
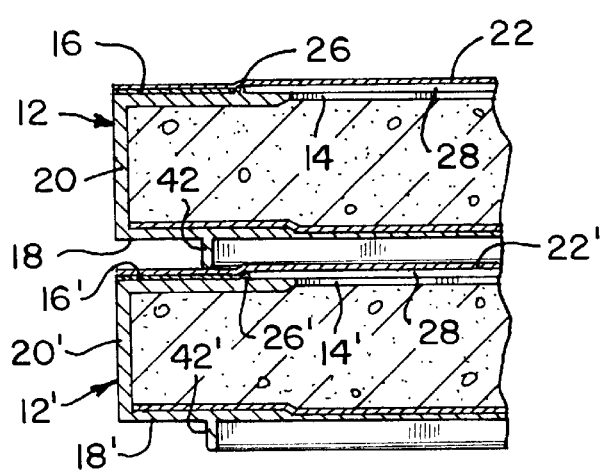
FIG. 3 is a partial detailed cross-sectional view of a first mirror stacked atop a second mirror according to a preferred embodiment.

Referring now to FIGS. 2 and 3, the rearward surface 18 of each frame member 28 includes a protruding stacking ridge 42 located generally parallel to the longitudinal axis of the of the frame member 20. The stacking ridge 42 protrudes at a predetermined distance from the rearward surface 18 of the frame member 28. The stacking ridge 42 is positioned outwardly from the supporting ridge 26 relative to the central region 14 such that a frame 12 may be stacked atop a forward surface 16' of another frame 12' without contacting the tautly supported film 20' of the other frame 12'. A noted advantage regarding the provision of the stacking ridge 42 is that a plurality of frame members may be securely stacked atop one another during shipping so to minimize the likelihood of damage during shipping. Additionally, the stacking ridge provides a compression force between the film 20' and the forward surface 16' to further ensure the adhesive connection between these two members. Further, a plurality of frame members may be stored in an orderly stacked orientation so to conserve valuable storage space.

At the portions of the mirror film 22 that are adhesively secured to the peripheral support surfaces 30 of the frame 12, the film 22 will generally not exhibit the mirror surface qualities exhibited by the central mirror surface portions. However, these portions may either be covered with trim members (not shown), or alternatively, they may be left exposed as shown.

While the embodiments shown and described are fully capable of achieving the objects and advantages of the invention, it is to be understood that these embodiments are shown and described solely for the purpose of illustration and not for limitation. It is contemplated that many changes and modifications may be made to the present invention without departing from the spirit and scope of the invention as disclosed above.

What is claimed is:

1. A frame defining a central region for supporting a film across said central region within a film plane, said frame comprising:

at least one supporting member having an adhering surface and a forward surface;

a supporting ridge located on said forward surface and spaced inwardly from the periphery of the at least one supporting member, said supporting ridge being generally parallel to the periphery of the at least one supporting member and positioned intermediate said adhering surface and said central region, said supporting ridge protruding from said forward surface by a predetermined distance and being adapted to support said film across said central region within said film plane;

an adhesive provided on said adhering surface to adhere said film to said adhering surface;

wherein said at least one supporting member includes a rearward surface having a stacking ridge located generally parallel to the periphery of said at least one supporting member and protruding from said rearward surface by a predetermined distance, said stacking ridge is positioned outwardly from said supporting ridge relative to said central region such that said frame is configured to be stacked atop a forward surface of another of said frame without contacting the supported film of said another frame.

2. A frame as recited in claim 1, wherein said adhering surface is located on said forward surface.

3. A frame as recited in claim 1, wherein said supporting ridge extends along the entire periphery of said at least one supporting member.

4. A frame as recited in claim 1, wherein said frame includes a plurality of supporting members joined together in a polygonal arrangement.

5. A frame as recited in claim 4, wherein said frame includes four supporting members.

6. A frame as recited in claim 1, wherein said adhesive includes transfer tape.

7. A frame as recited in claim 1, wherein said adhesive includes liquid adhesive.

8. A frame as recited in claim 1, wherein said adhesive includes double-sided pressure-sensitive tape.

9. A frame as recited in claim 8, wherein said predetermined distance is greater than the thickness of said double-sided pressure sensitive tape.

10. A frame as recited in claim 8, wherein said adhesive includes a plurality of pieces of double-sided pressure sensitive tape which overlap in a corner of said at least one supporting member.

11. A frame as recited in claim 10, wherein the height of said overlapped portion of tape at said corner of said at least one supporting member is approximately equal to said predetermined protruding distance of said supporting ridge.

12. A frame as recited in claim 1, wherein said film comprises of a mirror film having three layers, a first of said layers being a thin plastic film material, a second of said layers being a reflective material, and a third of said layers being a protective coating, said second layer being bonded between said first and third layers, said frame defining an aperture in said central region such that said third layer is exposed to the atmosphere.

13. A frame as recited in claim 12, wherein said third layer adheres to said adhesive.

14. A frame defining a generally planar central region, said frame comprising:

at least one supporting member having a longitudinal axis, a forward surface and a rearward surface;

a stacking ridge located on said rearward surface, said stacking ridge being generally parallel to said longitudinal axis and protruding from said rearward surface by a predetermined distance such that said frame is configured to be stacked atop a forward surface of another frame, wherein said rearward surface of said frame is spaced apart at said predetermined distance from the forward surface of said another frame;

wherein said at least one supporting member further includes an adhering surface and a supporting ridge located on said forward surface, said supporting ridge being generally parallel to said longitudinal axis of said at least one supporting member and positioned intermediate said adhering surface and said central region, said supporting ridge protruding from said forward surface by a predetermined distance and being adapted to support a layer of film across said central region, an adhesive provided on said adhering surface to adhere a portion of said film to said adhering surface, said stacking ridge being positioned outwardly from said supporting ridge relative to said central region such that frame is configured to be stacked atop a forward surface of another said frame without contacting said supported film within said central region of said another frame.

15. A frame as recited in claim 14, wherein said stacking ridge extends along the entire length of said at least one supporting member.

16. A frame as recited in claim 14, wherein said frame includes a plurality of supporting members joined together in a polygonal arrangement.

17. A frame as recited in claim 16, wherein said frame includes four supporting members.

18. A frame as recited in claim 14, wherein said adhesive includes a transfer tape.

19. A frame as recited in claim 14, wherein said adhesive includes liquid adhesive.

20. A frame as recited in claim 14, wherein said adhesive includes double-sided pressure-sensitive tape.

21. A frame as recited in claim 20, wherein said predetermined distance of said protrusion of said supporting ridge is greater than the thickness of said double-sided pressure sensitive tape.

22. A frame as recited in claim 21, wherein said film consists of a mirror film having three layers, a first of said layers being a thin plastic film material, a second of said layers being a reflective material, and a third of said layers being a protective coating, said second layer being bonded between said first and third layers, said frame defining an aperture in said central region such that said third layer is exposed to the atmosphere.

23. A frame as recited in claim 21, wherein said adhesive includes a plurality of pieces of double-sided pressure sensitive tapes which overlap in a corner of said at least one supporting member.

24. A frame as recited in claim 23, wherein the height of said overlapped portion of tape at said corner of said at least one supporting member is approximately equal to said predetermined protruding distance of said supporting ridge.

25. A display panel comprising:

a frame defining a central region, said frame including:

(i) at least one supporting member having a longitudinal axis, an adhering surface and a forward surface;

(ii) a supporting ridge located on said forward surface and spaced inwardly from the periphery of the at least one supporting member, said supporting ridge being generally parallel to said longitudinal axis and positioned intermediate said adhering surface and said central region, said supporting ridge protruding from said forward surface; and (iii) a panel adhesive provided on said adhering surface; and a decorative panel adhered to said adhesive and supported by said supporting ridge such that said decorative panel is supported across said central region;

wherein said at least one supporting member includes a rearward surface having a stacking ridge located generally parallel to said longitudinal axis of said at least one supporting member and protruding from said rearward surface, said stacking ridge being positioned outwardly from said supporting ridge relative to said central region such that said frame is configured to be stacked atop a forward surface of another frame without contacting the supported decorative panel of said another frame.

* * * * *